(12) United States Patent
Adeney et al.

(10) Patent No.: US 8,170,224 B2
(45) Date of Patent: May 1, 2012

(54) WIDEBAND SPEAKERPHONE

(75) Inventors: Kathryn Adeney, Dunrobin (CA); Dean Swan, Canton, NY (US)

(73) Assignee: Magor Communications Corporation (CA)

( * ) Notice: Subject to any disclaimer, the term of this patent is extended or adjusted under 35 U.S.C. 154(b) by 891 days.

(21) Appl. No.: 12/235,136

(22) Filed: Sep. 22, 2008

(65) Prior Publication Data
US 2010/0074452 A1 Mar. 25, 2010

(51) Int. Cl.
H04B 3/20 (2006.01)
(52) U.S. Cl. .................. 381/66; 379/406.06; 379/406.08
(58) Field of Classification Search ...................... 381/66; 379/406.06, 406.08
See application file for complete search history.

(56) References Cited

U.S. PATENT DOCUMENTS

| | | | |
|---|---|---|---|
| 5,479,474 A | 12/1995 | Schwartzman et al. | |
| 6,044,150 A | 3/2000 | Rigstad et al. | |
| 6,163,609 A * | 12/2000 | Makinen et al. | 379/406.08 |
| 7,068,780 B1 * | 6/2006 | Levonas et al. | 379/406.08 |
| 7,366,118 B2 | 4/2008 | Händel et al. | |
| 7,697,899 B2 * | 4/2010 | Rofougaran | 455/73 |
| 7,742,607 B2 * | 6/2010 | Karjalainen et al. | 381/66 |
| 7,817,797 B2 * | 10/2010 | Popovic et al. | 379/406.08 |
| 8,041,028 B2 * | 10/2011 | Adeney | 379/406.08 |
| 2002/0009204 A1 * | 1/2002 | Matsumura | 381/98 |
| 2003/0112966 A1 * | 6/2003 | Halder et al. | 379/406.05 |
| 2004/0234069 A1 | 11/2004 | Mikesell et al. | |
| 2007/0099578 A1 * | 5/2007 | Adeney et al. | 455/69 |
| 2007/0286404 A1 * | 12/2007 | Popovic et al. | 379/406.01 |
| 2008/0075193 A1 * | 3/2008 | Rofougaran | 375/295 |
| 2008/0267063 A1 * | 10/2008 | Trigui et al. | 370/229 |
| 2009/0111390 A1 * | 4/2009 | Sutton et al. | 455/77 |
| 2009/0245503 A1 * | 10/2009 | Fang | 379/406.08 |
| 2010/0074432 A1 * | 3/2010 | Adeney | 379/406.08 |
| 2010/0074452 A1 * | 3/2010 | Adeney et al. | 381/66 |
| 2010/0135482 A1 * | 6/2010 | Jagannathan et al. | 379/406.06 |
| 2010/0324890 A1 * | 12/2010 | Adeney | 704/201 |

FOREIGN PATENT DOCUMENTS
CA 2099575 2/1997

OTHER PUBLICATIONS
ISA/CA, "International Search Report", dated Dec. 22, 2009, pp. 1 to 3.

* cited by examiner

*Primary Examiner* — Laura Menz
(74) *Attorney, Agent, or Firm* — Laubscher & Laubscher, P.C.

(57) ABSTRACT

Processing requirements for acoustic echo cancellation in voice communications are significant and are even more so as the bandwidth of the communication increases. Whilst voice communication occupies a relatively narrow band of frequencies the processing requirements and so forth for wideband communication render acoustic echo cancellation difficult to achieve in a cost effective manner. The invention provides for acoustic echo cancellation within wideband communications by dividing the communications into sub-bands and applying acoustic echo cancellation to some sub-bands whilst processing other sub-bands according to the status of the communications. Additional sub-bands are transmitted at either full-duplex or half-duplex.

6 Claims, 4 Drawing Sheets

WIDEBAND SPEAKERPHONE

FIELD OF THE INVENTION

The invention relates generally to audio communication and more particularly to acoustic echo cancellation within wideband audio communication.

BACKGROUND

In audio communication, there is a known problem of echo. Echo is particularly problematic when speakerphone ("handsfree") functionality is used because voice data from both ends of a communication path is incident on a microphone at either end. To solve the echo problem, digital signal processing is used to subtract what is perceived by the digital signal processing to be echo related noise. To this end, converging processes have been designed to, over time, converge on an echoless or near echoless communication. As new processes have been designed, a time to converge and a quality of echoless communication has greatly improved.

Unfortunately, though a lot of research has been done in echo cancellation for voice communications having very limited bandwidth, complexity, processing requirements, and memory requirements increase as a supported bandwidth of the communication increases. Thus for wideband communication the processing requirements and so forth render echo cancellation difficult to achieve in a cost effective manner.

It would be advantageous to provide a voice communication system that overcomes some of the limitations of the prior art.

SUMMARY OF THE INVENTION

In accordance with an embodiment of the invention there is provided a method comprising: receiving at a first port a first signal representative of a first audio signal; receiving a second signal representative of a second audio signal for transmission; performing acoustic echo cancellation of the second signal within at least a first band of audio frequencies; detecting within at least one of the first signal and the second signal speech activity within at least a predetermined band; when speech activity is detected other than providing portions of the first audio signal within a second other band, at least some of the second other band outside the first band, to a loudspeaker while providing portions of the first audio signal within the first band to the loudspeaker; and when acoustic activity is other than detected providing portions of the first audio signal within the second other sub-band to a loudspeaker while providing portions of the first audio signal within the first band to the loudspeaker.

In accordance with another embodiment of the invention there is provided a method comprising: filtering a first signal representative of a first audio signal from a first location into a plurality of sub-band signals, each sub-band signal representing the portion of the first signal within a predetermined range of acoustic frequencies; filtering a second signal representative of a second audio signal from a second location into a plurality of sub-band signals, each sub-band signal representing the portion of the second signal within a predetermined range of acoustic frequencies; transmitting a predetermined portion of the plurality of sub-band signals of each of the second audio signal to the other location and a predetermined portion of the plurality of sub-band signals of the first audio signal to the speaker(s) in a half-duplex; and transmitting the remainder of the plurality of sub-bands of the second audio signal to the other location and the remainder of the plurality of sub-bands of the first audio signal to the speaker, in a full-duplex arrangement.

In accordance with another embodiment of the invention there is provided a method comprising: receiving a first signal representative of a first audio signal; receiving a second signal representative of a second audio signal; performing acoustic echo cancellation of the second signal within a first band of audio frequencies; detecting within the first signal acoustic activity within the first band of audio frequencies; when acoustic activity is detected other than providing portions of the first audio signal within a second other band, at least some of the second other band outside the first band, to a loudspeaker while providing portions of the first audio signal within the first band to the loudspeaker; and, when acoustic activity is other than detected providing portions of the first audio signal within the second other band to a loudspeaker while providing portions of the first audio signal within the first band to the loudspeaker.

In accordance with another embodiment of the invention there is provided a method of transmitting acoustic information comprising: transmitting acoustic information within a first band and third band of frequencies in full duplex; and transmitting acoustic information within a second and fourth other band of frequencies and having half-duplex echo cancellation applied thereto.

In accordance with another embodiment of the invention there is provided a method of transmitting acoustic information comprising: transmitting acoustic information within a first band of frequencies in full duplex; detecting voice activity within the first band; and controlling switched loss within at least another band of frequencies of the acoustic information in dependence upon the detected voice activity.

In accordance with another aspect of the invention there is provided a system for transmitting acoustic information within a first band of frequencies in full duplex; detecting voice activity within the first band; and controlling switched loss within at least another band of frequencies of the acoustic information in dependence upon the detected voice activity.

BRIEF DESCRIPTION OF THE DRAWINGS

Exemplary embodiments of the invention will now be described in conjunction with the following drawings, in which.

DETAILED DESCRIPTION OF INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

The term multipath is used in the description below and in the claims to refer to audio information received at a transducer along more than a single path from a same source allowing for different delay between same audio information received via different paths.

The term video conferencing as used herein or in the claims that follow refers to a video communication between two or more parties, at least two of the parties remote from one another such that an audio and a video signal is transmitted electronically therebetween.

The term band is used herein to refer to a grouping of frequencies. Though typically a band will consist of a contiguous range of frequencies, band, as used herein also refers to non-contiguous ranges of frequencies and is intended to be interpreted as a set of frequencies falling within a predetermined range or group of ranges.

Figure 1A:
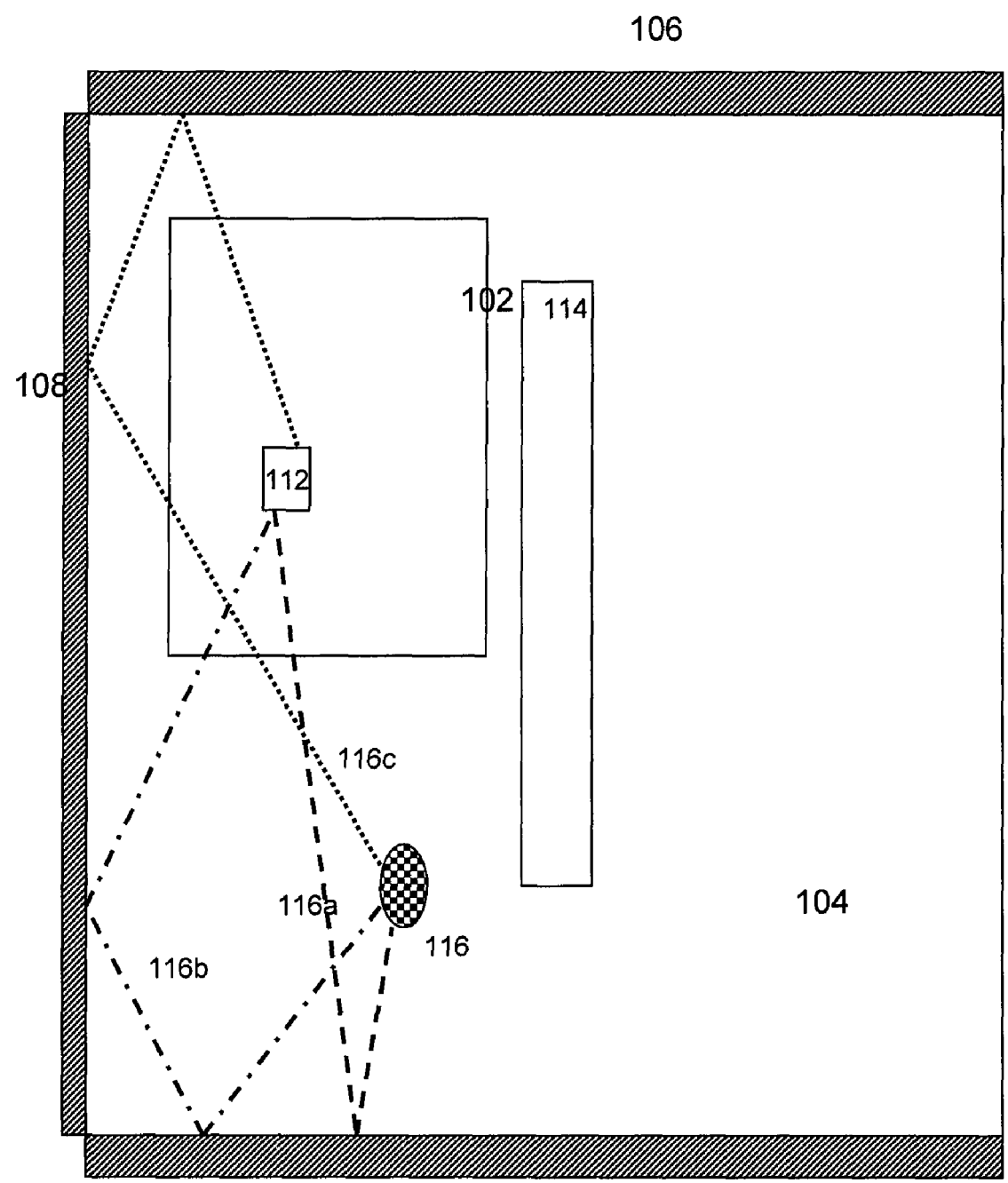
FIG. 1A depicts a typical environment within which a speakerphone is employed.

Referring to FIG. 1A, a simplified diagram of a first end of a communication connection is shown. A second distant end (not shown) is essentially similar in content to the first end shown. In FIG. 1, a room 100 is shown having a speaker phone therein. The speaker phone in the form of a conferencing system comprises a microphone 112 on a desk or table 102 and located for proximity to a person speaking (not shown), an optional video monitor 114 for displaying an image is shown for when the conferencing system comprises video conferencing, and one or more audio loudspeakers 116 for playing sounds from the second distant end of the communication connection. Of course, when video conferencing is not supported, the video monitor is optionally omitted. It is known that loudspeaker 116 may or may not be part of a same physical device comprising the microphone 112.

Sound emitted by the loudspeaker 116 is not perfectly focused and, as shown at 116a, 116b, and 116c, traverses a plurality of paths. The signal 116a reflects off of wall 104 and is then incident upon microphone 112. The signal 116b, reflects off of walls 104 and 108 and is then incident upon microphone 112. The signal 116c reflects off walls 106 and 108 and is then incident upon microphone 112. As is evident, each of these signals traverses a different path length and is incident on the microphone at different angles. It will be evident to those of skill in the art that a number of signals incident on the microphone 112 is not limited to three signals and includes signals that traverse a straight path between the loudspeaker 116 and microphone 112 and signals having reflections, attenuations, and so forth along their path.

When several acoustic paths lead to the microphone 112 the effects are noticeable and difficult to characterize. This is further aggravated with the introduction of one or more further loudspeakers. Further, when sound originating from the far end of the communication path is resent to the far end of the communication path, an echo results which is uncomfortable for a user of the system. Because of this problem, most modern speakerphones employ acoustic echo cancellation to cancel voice signals in the room that are likely reflective of echo. When no multipath exists, data indicative of the signal provided to the speaker 116 is provided to a processor for being subtracted from a signal provided by the microphone 112. Unfortunately, due to multipath and other acoustic effects observed in a speakerphone such as speaker distortion, acoustic echo cancellation is not a simple task.

Figure 1B:
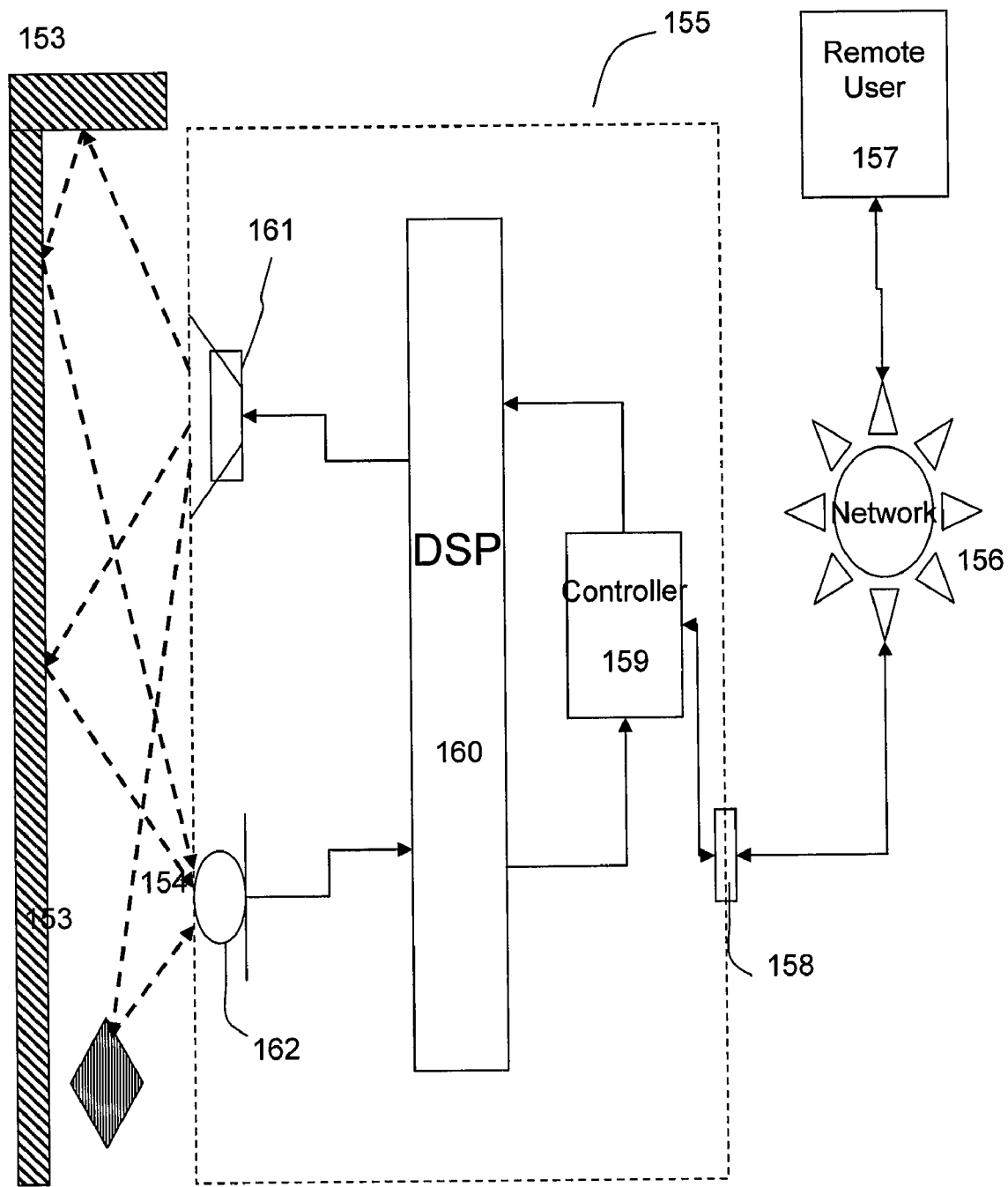
FIG. 1B depicts an echo cancellation approach according to the prior art.

Shown in FIG. 1B is simplified block diagram of a prior art echo cancellation speakerphone 155. A user (not shown) speaks in a room (not shown) comprising walls 153 and objects 154 and speakerphone 155 (not shown to scale) that is in communication via a network 156 and to a second user system 157.

The speakerphone 155 is coupled to the network 156 via a network interface 158. Electrically coupled to the network interface 158 is controller 159 comprising a transceiver for providing an Rx signal to DSP circuit 160 and for transmitting a TX signal via the network interface 158 and the network 156 to a destination system in the form of the remote user system 157. The Rx signal and the TX signal comprise data relating to an audio signal received from or for provision to the remote user system 157. The DSP circuit 160 is coupled to loudspeaker 161 and microphone 162. Typically, DSP circuits comprise digital to analogue (DAC) and analogue to digital (ADC) conversion circuitry. When this is not the case, an external DAC and ADC circuit is employed. Optionally, the external DAC is part of the loudspeaker 161. Further optionally the ADC is part of the microphone 162. The DSP circuit 160 processes the Rx signal from the second user system 157 to provide to the loudspeaker 161 a loudspeaker signal and processes the digitized signal from the microphone 162 to generate a TX signal to be provided to the controller for transmission to the second user system 157. The DSP circuit 160 reduces an acoustic echo portion of the TX signal based on the Rx signal and an acoustic echo cancellation process. Additional processing is often employed to remove residual echo not removed by the acoustic echo cancellation process. When an adaptive acoustic echo cancellation process is used, the acoustic echo cancellation process converges over time to adjust for different room dynamics.

Figure 2:
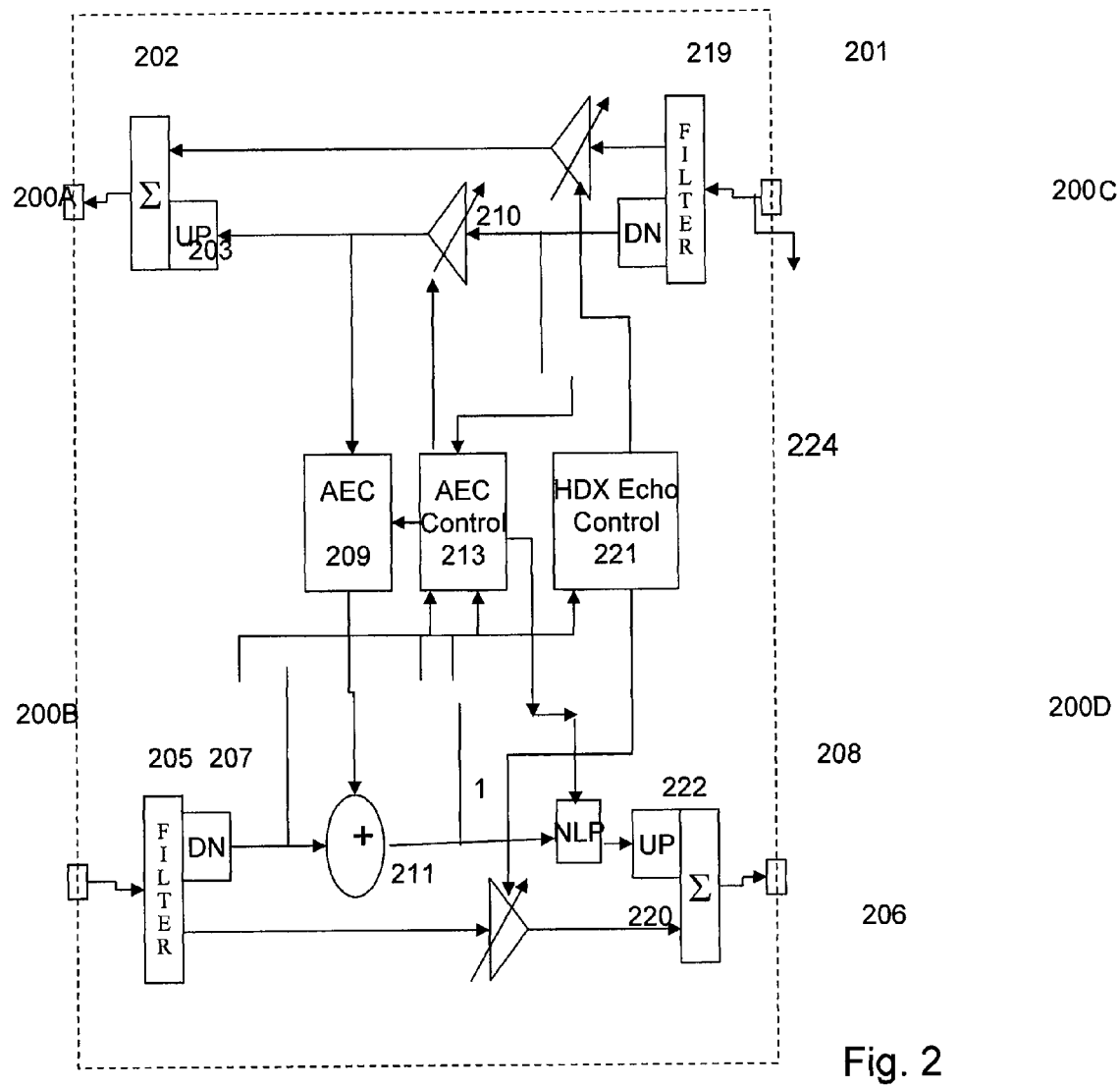
FIG. 2 depicts an embodiment of the invention employing four sub-bands, a second and fourth band operating in half-duplex and a first and third other sub-band operating in full duplex with echo cancellation.

Referring to FIG. 2, a simplified block diagram of an acoustic echo cancellation system according to the invention is shown. The acoustic echo cancellation system provides a speaker signal representative of an audio signal that is provided to a loudspeaker (not shown) from port 200A and receives an audio signal indicative of a sound impinging on a microphone (not shown) at port 200B. The speaker signal and microphone signal comprise the signals received/provided at interfaces at a local end of a communications link. A distant end of the communications link is provided a signal via the communications link to the acoustic echo cancellation system for use in acoustic echo cancellation. This signal comprises an Rx signal 205 received at port 200C. Further a Tx signal is provided from the acoustic echo cancellation system to the network via port 200d. When more than one speaker is used, a same signal is optionally provided to each speaker. Alternatively, each speaker receives a different signal. Further alternatively, each speaker receives a different signal generated by a different circuit. Similarly, when more than one microphone is used, each microphone provides a different signal to a separate circuit for digitization thereof and for processing thereof to perform acoustic echo cancellation. Alternatively, the microphone signals are multiplexed to a same circuit for digitization and processing thereof. Preferably, for a plurality of microphones, a plurality of identical processing paths is provided, one for each microphone.

Considering initially the path for the Rx signal from port 200C to port 200A, the Rx signal is coupled to first filter bank 201 wherein it is separated into at least two bands., a first band and a second other band, with the first band selected a priori such that it contains more speech energy than the second other band. In a system dividing the signal into only two bands, this is generally the lower-frequency band. Optionally, the filter bank separates the signal into more than two bands. A second band is coupled to first variable gain stage 219 for attenuating the signal in accordance with a control signal received from half-duplex (HDX) Echo Control 221. From the variable gain stage 219 the signal propagates to first summation circuit 202 before being coupled to port 200A as part of the signal provided to the loudspeaker. The first band from the filter bank 201 is converted by first down-converter 204 resulting in a lower sample-rate, then adjusted via second variable gain stage 210 before being re-converted to the original sample rate, using first up-converter 203 and coupled to the first summation circuit 202 as the remainder of the signal provided to the loudspeaker. Additionally the down-converted first band from the first filter bank 201 is coupled to first HDX control block and the AEC control block. The first band from the first filter bank 201 once amplified by the variable gain stage 210 is provided to adaptive echo canceller 209 for use in canceling of echo within a transmit path.

Similarly the audio signal received at port 200B is processed by the acoustic echo cancellation system to provide the TX signal at port 200D. In this path the audio signal is coupled to a second filter bank 205 wherein the audio signal is separated into a third band and a fourth band. Preferably, the third band spans the same range of frequencies as the first band. Therefore, it is preferred that filter bank 205 and filter bank 201 are identical filter circuits. Optionally, the audio signal is separated into more than two bands in each direction. The fourth band is coupled to third variable gain stage 220 for attenuating the signal in accordance with a control signal received from HDX Echo Control 221 and then to second summation circuit 206 to form part of the TX signal. The third band from the second filter bank 205 is initially down-converted by down-converter 207 before being coupled to mixer 211. The signal within the third band is also provided to the AEC control block 213. Mixer 211 also receives a signal from the adaptive echo canceller 209. The mixed signal from the mixer 211 is then input to a residual echo control stage (prior art) 222 before being up-converted via up-converter 208 and provided to the second summation circuit 206 to form the remainder of the TX signal 214. Additionally, the output signal from the mixer 211 is coupled to the AEC 209, AEC control block 213 and the HDX echo control block 221. The AEC 209, AEC control block 213 and the HDX echo control block 221 are optionally implemented using various methods many of which are well known.

The HDX echo controller 221 based upon its input signals determines control signals to be applied to the first variable gain stage 219 and the third variable gain stage 220. Optionally, the HDX echo controller 221 also determines control signals for the amplifiers 210 and 222. The AEC controller 213 provides a control signal to adaptive echo canceller (AEC) 209 which processes a tapped portion of the first band from the first filter bank 201 after the second variable gain stage 210 and couples a result of the processing to the mixer 211.

The HDX echo controller 221 determines gain settings for the first variable attenuation stage (i.e, max gain for these components is 0dB) and for the third variable gain stage 220. This allows for an adjustment to an amplitude (volume) of those signals before being summed at first summation circuit 202 and at second summation circuits 206, respectively, to provide the received Rx signal to the speaker signal output port 200A and TX signal output port 200D. By controlling the amplifier in a digital fashion, the signals provided to variable gain stage 219 and to variable gain stage 220 are optionally one of "on" and "off" supporting half duplex communication for the second band and for the fourth band. The control and implementation of half-duplex audio communication is well known in the art. Of course it will be apparent to those of skill in the art that the block diagram shown is simplified and that other circuit elements such as gain blocks, power sources, out of band filters and so fourth may be added to the overall circuit. Further, other processing of the signals by the DSP is optionally performed but is outside the scope of the present invention.

The present embodiment allows the portions of the band wherein adaptive echo cancellation is performed to propagate through paths designed according to well known echo cancellation arrangements and architectures. Further, the present embodiment allows the portions of the band wherein half duplex operation is supported to propagate through paths designed according to well known half duplex arrangements and architectures. Of note in the above described embodiment the signals are separated into at least four bands and at least two of said bands are provided to a circuit for echo cancellation and another two of said bands are provided to a circuit for operation in a half duplex mode of communication. The first and third bands are provided for acoustic echo cancellation using a known technique within the prior art or another technique suitable for acoustic echo cancellation. The second and fourth bands do not have adaptive echo cancellation applied thereto and, instead, a half-duplex (HDX) echo cancellation mechanism is applied. Such a half-duplex echo cancellation being for example switched loss and/or non-linear processing (NLP). Since half-duplex echo cancellation relies upon decisions about voice activity, such as is there activity and if so in which communication direction—Tx or Rx, the HDX echo controller 221 makes a determination of voice activity in each of the Tx and Rx signals, the voice activity detected outside the bands to which HDX echo control is applied.

Optionally, the approach outlined supra in respect of echo cancellation system is extended to three or more bands for each of the TX and Rx signals. In such a case, acoustic echo cancellation is performed on one band and the HDX echo controller 221 optionally controls each of the other bands. The control decisions are based upon measurements from one or more of the bands including at least one band outside the bands for which half-duplex echo cancellation is performed. Alternatively, a plurality of the sub-bands has adaptive echo cancellation performed thereon and one or more of the other sub-bands is operated in half duplex mode.

Alternatively, in the embodiment of FIG. 2, the downsampling operation on the Rx path (at 201), is omitted as is the upconverting at 203 in the same path.

Beneficially the invention allows a wideband audio bandwidth wider than a mere telephony band supporting full-duplex communication within some bands to be achieved, without the processing requirements or artifacts of wideband audio echo cancellation.

Figure 3:
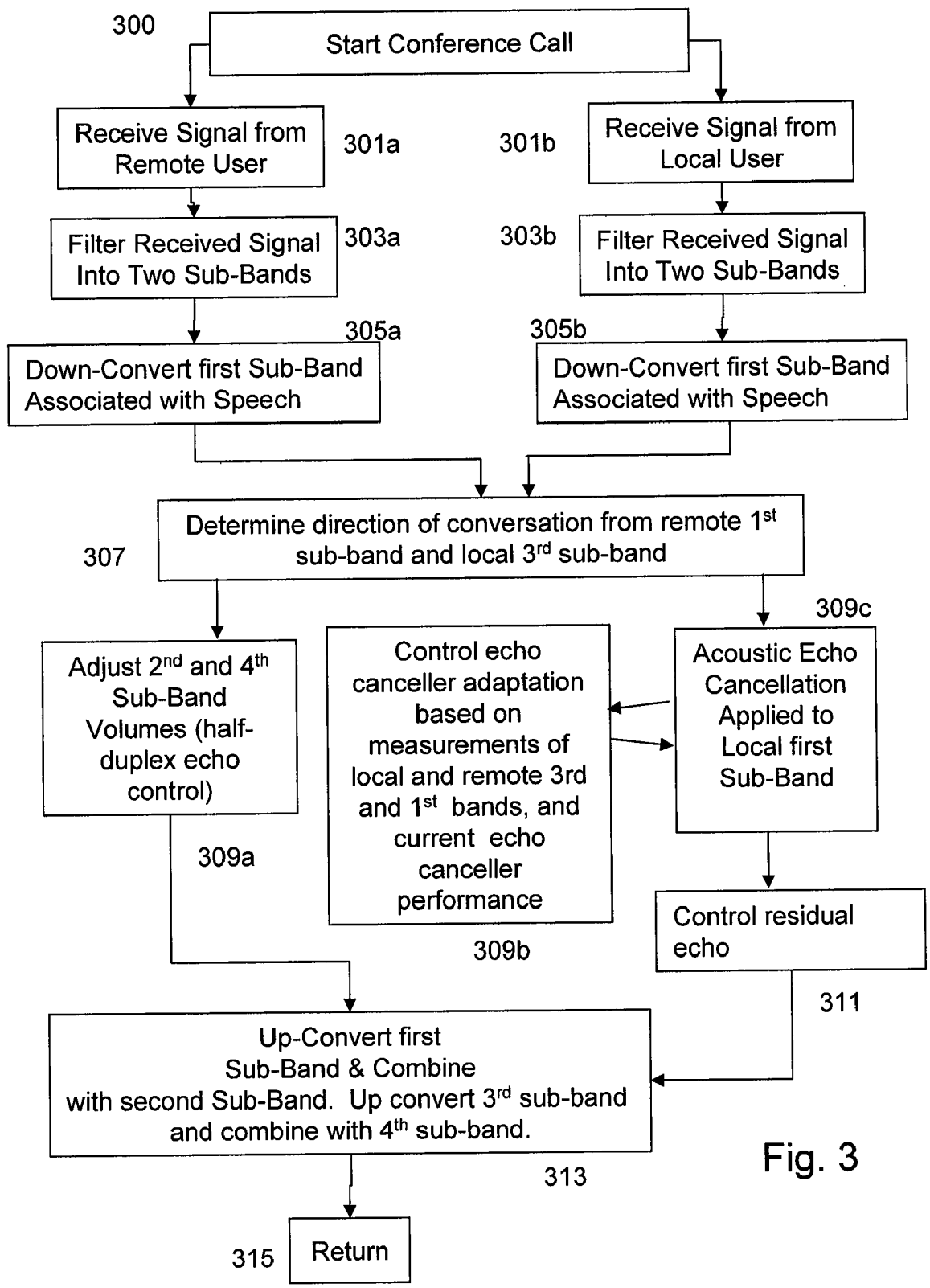
FIG. 3 is a simplified flow diagram of an embodiment of the invention with four sub-bands.

Illustrated in FIG. 3 is a simplified flow diagram of an embodiment of the invention for a speakerphone at one end of an audio conference call. At 300 the conference call is initiated between a local user and a remote user. At 301a the audio signal from the remote user is received, and then at 303a is filtered into bands. At 305a a third band associated with a predetermined bandwidth associated with speech is down-converted and at 307 this signal is used in determining the activity level and dominant direction of conversation. This determination is then employed at 309a, 309b, and 309c to determine a course of action.

At 301b the audio signal from the local user is received, and then at 303b is filtered into bands. At 305b a first band associated with a predetermined bandwidth associated with speech is down-converted and at 307 this signal is used in determining the activity level and dominant direction of conversation. This determination is then employed at 309 to determine a course of action. At 309a, half duplex echo control is applied to the second and fourth bands.

Adaptive echo cancellation is applied to the third band from the local user at 309*b* and 309*c*, wherein a converging process is used. At 311, residual echo within the third band from the local user is controlled.

The respective echo controlled signals are summed to their respective output ports 313. The flow then returns at 315 for a next sample in time of each of the respective signals.

Accordingly the third band associated with speech is transmitted continuously and echo cancellation is applied to the third band using the remote first band signal. The second and fourth bands are transmitted in half-duplex (HDX). Half Duplex echo control is well known in the art of echo cancellation.

Alternatively, the second and fourth bands are operated in half duplex mode based solely on a content of the second and fourth bands in the remote and local signals, respectively.

Though the above noted embodiments are described with a speaker, more than one speaker is useable with the present invention. Further, the speaker(s) is optionally integrated within a communication device or peripheral thereto. Optionally, the peripheral speaker is wirelessly coupled to the communication device. In an embodiment, some speakers are integrated within the communication device and some are peripheral thereto.

The network is one of various available communication networks. Examples of communication networks include but are not limited to an Ethernet network, an IP network, a broadband network, a public telephone network, a satellite communication network.

Though the invention is described with reference to conferencing systems, it is also applicable to video conferencing systems, speakerphones, to hands free telephones or telephones operated in a hands free mode of operation, and to other communication devices providing bidirectional voice communication wherein acoustic echo cancellation is advantageous.

Numerous other embodiments may be envisaged without departing from the spirit or scope of the invention.

What is claimed is:

1. A speaker phone system comprising:
    a receive channel for receiving a first signal from a far end device over a duplex communications link for conversion to an acoustic signal on a local speaker;
    a transmit channel for receiving a second signal from a near end transducer for transmission to the far end device;
    respective filters at inputs of the receive and transmit channels to split each of said transmit and receive channels into at least two pairs of frequency bands, wherein each frequency band in the transmit channel is paired with a frequency band in the receive channel;
    an echo canceller for performing adaptive echo cancellation in at least one pair of frequency bands;
    a half-duplex controller for imposing half-duplex operation in the transmit and receive channels in at least one other pair of frequency bands;
    a summer at an output of each channel for recombining the frequency bands.

2. A speakerphone system as claimed in claim 1, further comprising a down-sampler at the input and an up-sampler at the output of each channel in said at least one pair of frequency bands.

3. A speakerphone system as claimed in claim 1, wherein the frequency bands in each pair of frequency bands correspond to the same range of frequencies.

4. A speakerphone system as claimed in claim 1, wherein the transmit and receive channels are split into two pairs of frequency bands and the echo canceller is arranged to perform echo cancellation in the pair of frequency bands with the lower frequency.

5. A speakerphone system as claimed in claim 1, further comprising variable gain attenuators in at least one other pair of frequency bands in the transmit and receive channels controlled by the half-duplex controller.

6. A speakerphone system as claimed in claim 5, further comprising a variable gain attenuator in the frequency band of said one at least pair of frequency bands in the receive channel.

* * * * *